(12) United States Patent
Materne et al.

(10) Patent No.: US 6,780,925 B2
(45) Date of Patent: Aug. 24, 2004

(54) RUBBER COMPOSITION WITH SILICA REINFORCEMENT OBTAINED WITH AN AMINO ACID OR AMINO ACID-CONTAINING PROTEIN BASED ACTIVATOR AND USE THEREOF IN TIRES

(75) Inventors: Thierry Florent Edme Materne, Richfield, OH (US); Francois Kayser, Bertrange (LU); Michael Paul Mallamaci, North Canton, OH (US); Harlan Roy Wilk, Tallmadge, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 10/316,644

(22) Filed: Dec. 11, 2002

(65) Prior Publication Data

US 2003/0135006 A1 Jul. 17, 2003

Related U.S. Application Data

(60) Provisional application No. 60/344,883, filed on Dec. 21, 2001.

(51) Int. Cl.⁷ .............................................. C08L 47/00

(52) U.S. Cl. ...................... 524/571; 528/284; 525/342; 525/343; 524/492; 152/209.1

(58) Field of Search ................................. 524/571, 492; 528/284; 525/342, 343; 152/209.1

(56) References Cited

U.S. PATENT DOCUMENTS

| 4,289,861 A | * | 9/1981 | Onizawa |
| 5,064,910 A |   | 11/1991 | Hattori et al. ............... 525/359 |
| 5,672,639 A |   | 9/1997 | Corvasce et al. ............. 524/52 |

FOREIGN PATENT DOCUMENTS

| EP | 1061097 | 12/2000 | ........... C08K/5/548 |

* cited by examiner

Primary Examiner—Kuo-Liang Peng
(74) Attorney, Agent, or Firm—Henry C. Young, Jr.

(57) ABSTRACT

The invention relates to the preparation of a silica reinforced rubber composition where alkoxysilane and/or sulfur cure reactions within the elastomer host are controlled by the use of a selected amino acid, or amino acid-containing protein based, activator. The invention also relates to such composite and to a tire having at least one component of such composite.

18 Claims, No Drawings

RUBBER COMPOSITION WITH SILICA REINFORCEMENT OBTAINED WITH AN AMINO ACID OR AMINO ACID-CONTAINING PROTEIN BASED ACTIVATOR AND USE THEREOF IN TIRES

The Applicants hereby incorporate by reference prior U.S. Provisional Application Serial No. 60/344,883, filed on Dec. 21, 2001.

FIELD OF THE INVENTION

The invention relates to the preparation of a silica reinforced rubber composition where alkoxysilane and/or sulfur cure reactions within the elastomer host are controlled by the use of a selected amino acid, or amino acid-containing protein based, activator. The invention also relates to such composite and to a tire having at least one component of such composite.

Such amino acid-containing proteins are defined as proteins which contain one or more of such selected amino acids to enhance the formation of the alkoxysilane condensation reaction product within an elastomer host, to enhance the silane/elastomer interactions as well as to provide some unique synergism with the sulfur cure system for the elastomer composition Such amino acid-containing proteins are referred to herein as "derived protein(s)" as being the condensation product of amino acids of which at least one of such amino acids is a selected amino acid as defined and required by this invention.

The invention also relates to such composite and to a tire having at least one component comprised of such composite

BACKGROUND OF THE INVENTION

Elastomer compositions typically contain particulate filler reinforcement such as, for example, carbon black and/or silica.

Silica reinforcement for an elastomer composition may be provided by adding particulate silica such as, for example, precipitated silica, to a rubber composition.

In practice, particularly where a particulate silica-based filler is added to an elastomer composition as an elastomer reinforcement such as, for example, an aluminosilicate or silica-modified carbon black, a coupling agent is often used to aid in coupling the filler to one or more diene-based elastomers. The use of various coupling agents for such purpose is well known to those having skill in such art.

Such coupling agents may be, for example, an alkoxyorganosilane polysulfide which has a constituent component, or moiety, (the alkoxysilane portion) capable of reacting with, for example, silanol groups, on the silica surface of the silica-containing filler and, also, a constituent component, or moiety, (the polysulfide portion) usually capable of interacting with the rubber, particularly a diene-based, sulfur vulcanizable rubber which contains carbon-to-carbon double bonds, or unsaturation. In this manner, then, the coupler may act as a connecting bridge between the silica-containing filler and the rubber and, thereby, enhance its reinforcing effect for the rubber composition.

In particular, it is envisioned that the silane moiety of the coupler, particularly a trialkoxysilane moiety, is available for reacting with virtually any reactive hydroxyl groups it may encounter and particularly with silanol groups (—Si—OH) on the surface of the silica-based filler and also with alkoxy groups on the coupler itself to form siloxane units (—Si—O—Si—).

In practice, alkoxyorganosilane polysulfides sometimes used are bis-(3-trialkoxysilylalkyl)polysulfides which contain from about 2 to 8, with an average of from about 3.5 to 4.5, sulfur atoms in its polysulfidic bridge.

During a typical mixing (processing) of the elastomer composition in an internal rubber mixer under high shear conditions to temperatures in a range of 150° C. to 175° C., the silane portion reacts with the surface of a silica-based filler (e.g.: which may be hydroxyl groups on the surface of the silica which may be in a form of silanol groups).

A portion of the polysulfidic bridge of such organosilane polysulfide typically breaks during such mixing operation, resulting in an exposed sulfur on the coupling agent which is available to apparently interact with one or more of the elastomer(s) in the elastomer composition.

However, it is to be appreciated that such interaction of the sulfur with the elastomer(s) is typically accompanied by an increase in the viscosity (e g. Mooney viscosity) of the rubber composition itself as the sulfur interacts with the elastomer(s). Too high of an elastomer viscosity under such conditions makes the rubber composition more difficult to process, or mix, in a typical internal rubber mixer.

Therefore, a degree of adjustment of various formulation ingredients (formulation tuning) and enhancement of various physical properties is limited because of such typical higher viscosity related processing limitations imposed via use of such coupling agent.

Uniquely, however, organosilane polysulfide compounds in a form of organosilane disulfide compounds with predominately contained only about two sulfur atoms in the polysulfidic bridge (e.g. and an average of about 2 to about 2.6 sulfur atoms) do not ordinarily cause such excessive viscosity build-up of the rubber composition during its internal mixing operation.

Such phenomenon in the use of the organosilane disulfide compounds is apparently due to stronger sulfur-to-sulfur bonds for the polysulfidic bridge of the disulfide and their inherent resistance to breaking upon high shear mixing at the aforesaid elevated temperatures, thus, enabling only a very limited amount of sulfur atoms available to interact with diene-based elastomer(s) in the rubber composition during the mixing operation. This phenomenon is well known to those having skill in such art.

Accordingly, it is desired to more effectively utilize the aforesaid rubber processing advantages afforded via use of such organosilane disulfide compound, including a bis-(trialkoxyorganosilane)disulfide, compound as a coupling agent.

It is a purpose of this invention to enhance the formation of the alkoxysilane condensation reaction product within an elastomer host, to enhance the silane/elastomer interactions as well as to provide some unique synergism with the sulfur cure system for the elastomer composition While it is known from said EP Publication No. 1 061 097 that silica reinforcement may be improved by a condensation reaction of an alkoxysilane, particularly an alkoxysilane polysulfide promoted or retarded by the presence of acidic or base materials, the use of a specific type of amino acid, or proteins containing such amino acid, as described herein and required for this invention is believed to be novel and inventive.

The term "phr" as used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms such as "rubber composition", "compounded rubber" and "rubber compound", if used herein, are used interchangeably to refer to "rubber which has been blended or mixed with various ingredients and materials" and "rubber compounding" or "compounding" may be used to refer to "the mixing of such materials". Such terms are well known to those having skill in the rubber mixing or rubber compounding art.

The term "derived protein(s)" as used herein is intended to mean amino acid-containing protein(s) which contains one or more amino acids specified herein available to interact with organosilanes and/or sulfur cure systems as discussed herein unless otherwise indicated.

SUMMARY AND PRACTICE OF THE INVENTION

In accordance with this invention, a process of preparing a composite of an elastomer composition which contains a silica-based reinforcement therein comprises the sequential steps of:

(A) thermomechanically mixing in at least one preparatory mixing step to a temperature of about 140° C. to about 190° C., alternatively to a temperature of about 150° C. to about 185° C., (1) 100 parts by weight of at least one sulfur vulcanizable elastomer selected from homopolymers and copolymers of conjugated diene hydrocarbons copolymers of at least one conjugated diene hydrocarbon and vinyl aromatic compound, (2) about 15 to about 100, alternatively about 30 to about 90, phr of particulate filler comprised of at least one silica-based filler which contains reactive hydroxyl groups on the surface thereof (e.g.: silanol groups), (3) about 0.05 to about 20 parts by weight per part by weight of said particulate filler of at least one organosilane compound, preferably a polysulfide compound and, more preferably, a disulfide selected from at least one of Formula (I) and (II), preferably Formula (I), their mixtures:

  (I)

  (II)

wherein n has a value of from 2 to 8 with an average of from 3.5 to 4.5, or an integer of from 2 to 4 with an average of from 2 to 2.6;

wherein Z is selected from the group consisting of:

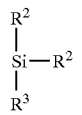  (Z1)

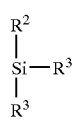  (Z2)

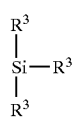  (Z3)

wherein Z is preferably (Z3);

wherein $R^1$ is selected from the group consisting of a substituted or unsubstituted alkylene group having a total of 1 to 18 carbon atoms and a substituted or unsubstituted arylene group having a total of 6 to 12 carbon atoms, preferably alkylenes having from 2 to 6 carbon atoms; wherein $R^2$ may be the same or different and is individually selected from the group consisting of alkyls having 1 to 4 carbons and phenyl; and $R^3$ may be the same or different and is individually selected from $R^4O$— radicals wherein $R^4$ is an alkyl group containing from 1 to 4 carbon atoms, preferably from methyl and ethyl groups and more preferably an ethyl group; and wherein X is selected from mercapto, thiocyanato, amino, vinyl, epoxide, acrylate and methacrylate groups, preferably mercapto, epoxide and amine groups;

(B) mixing therewith, preferably subsequently mixing therewith, at least one amino acid as an alkoxysilane condensation reaction promoter, silane elastomer interaction promoter and/or as sulfur cure system activator for the elastomer composition and/or derived protein which contains at least one of said amino acids, wherein said amino acid(s) is of the general Formula (III):

  (III)

wherein R is selected from one of Formulas (IV), (V), (VI) and (VII):

  (IV)

  (V)

  (VI)

  (VII)

wherein $R^5$ is an alkyl radical containing from 1 to 6, alternatively from 1 to 3 carbon atoms or an aryl radical (or alkyl substituted aryl radicals) which contain from 6 to 12, alternately from 6 to 10 carbon atoms, and wherein $R^6$ is an alkyl radical containing from 1 to 6, alternatively from 3 to 6 carbon atoms or an aryl radical (or alkyl substituted aryl radicals) which contain from 6 to 12, alternately from 6 to 10 carbon atoms;

(C) subsequently blending sulfur therewith, in a final thermomechanical mixing step at a temperature to about 100° C. to about 130° C.

For said final mixing step, usually elemental sulfur is added in an amount of about 0.4 to about 3 phr.

For said specified amino acids for use in this invention, representative examples of $R^5$ and $R^6$ are, for example, —$CH_2$ for $R^5$ and —$CH_2$—$C(NH_2)(COOH)$ for $R^6$.

Representative examples of specified amino acids of Formula (III) are glutamine and asparagine as $(NH_2)C$=$OCH_2CH_2C(NH_2)(COOH)$ and $(NH_2)C$=$OCH_2C(NH_2)(COOH)$, respectively, where R is of Formula (VI), cysteine as $HSCH_2C(NH_2)(COOH)$ where R is of Formula (V); cystine as $(COOH)(NH_2)CCH_2SSCH_2C(NH_2)(COOH)$ when R is of Formula (VI), serine and threonine as $HOCH_2(NH_2)(COOH)$ and $HOCC(CH_3)C(NH_2)(COOH)$, respectively, when R is of Formula (VII).

Preferably, said specified amino acid is cysteine, namely where R is $R^5SH$ from (Formula (V).

Said specified amino acids are designated for use in this invention on a basis that they are understood to not only participate as activators for activation of the silane condensation reaction, but also have an ability to react with a diene based elastomer or an ability to act synergistically with the cure activators for sulfur cure systems for curing the diene-based elastomer compositions.

For example, the cysteine and cystine amino acids are considered herein as being useful as promoters for the silane condensation reaction within the elastomer host, as being interactive with diene-based elastomers (e.g. cis 1,4-polybutadiene, cis 1,4-polyisoprene and styrene/butadiene elastomers), perhaps with carbon-to-carbon bonds therein although the mechanism is not entirely understood, to enhance various physical properties of the resultant elastomer and also useful as being synergistic with sulfur cure accelerators to accelerate the cure of rubber compositions with accelerators such as for example, mercaptobenzothiazole based accelerators curatives and sulfenamide based accelerators.

For example, glutamine and serine amino acids are considered herein as being useful as promoters for the silane condensation reaction, particularly an alkoxysilane condensation reaction, within the elastomer host and also useful as being synergistic with sulfur cure accelerators to accelerate the cure of rubber compositions with accelerators such as for example, mercaptobenzothiazole based accelerators curatives and sulfenamide based accelerators.

It is considered herein that such specified amino acids or the derived proteins as activators for the silane condensation reaction are significantly differentiated from protein based activators such as whey protein isolate, vegetable protein isolate and peptides containing one amino group selected from arginine, lysine, hydroxylsine, histidine, proline, hydroxyproline, tryptophane and leucine.

In practice, the silica-based fillers are preferably selected from at least one of aggregates of precipitated silica, aluminosilicate and silica-treated carbon black having silica domains on its surface, wherein said precipitated silica and silica domains of said silica treated carbon black contain hydroxyl group (e.g. silanol groups) on their surface.

In one aspect of the invention such process is provided wherein said preparatory mixing is conducted in at least two sequential thermomechanical mixing steps in at least one internal rubber mixer; wherein at least two of said mixing steps are conducted are conducted to a temperature in a range of about 140° C. to about 190° C., with intermediate cooling of the rubber composition between at least two of said mixing steps to a temperature below about 50° C.

In practice, the total, cumulative period of mixing, namely period of mixing in an internal rubber mixer(s), for the said preparatory mixing step(s) (A) may, for example, be in a range of about 3 to about 20, alternatively about 5 to about 15, minutes.

In practice, the period of mixing for the final thermomechanical mixing step, namely period of mixing in an internal rubber mixer, (B) may, for example, be in a range of from about one to about five minutes.

In further accordance with process of this invention, said preparatory mixing step (A) is composed of at least two sequential mixing stages in which said elastomer, said particulate silica-based filler and said organosilane polysulfide compound, preferably an organosilane disulfide compound, are added and mixed in one or more sequential mixing stages and in which said specified amino acid or derived proteins based silane condensation reaction promoter or inhibitor is added subsequently to the addition of both of said particulate filler and organosilane polysulfide in the same or subsequent mixing stage.

In additional accordance with the process of this invention, said preparatory step (A) is composed of at least two sequential mixing stages in which about 20 to about 60 weight percent of each of the said silica-based filler, and said organosilane polysulfide compound, preferably an organosilane disulfide compound, are added and mixed in a first preparatory mixing stage and the remainder thereof added and mixed in at least one subsequent preparatory mix stage and the specified amino acid or derived proteins based silane condensation promoter or inhibitor added and mixed subsequent to the completed addition of said filler and organosilane polysulfide in the same or subsequent mixing stage.

In practice, the organosilane polysulfide compound, preferably said organosilane disulfide compound, is optionally added to the thermomechanical preparatory mixing step in a form of a particulate comprised of (A) about 25 to about 75, preferably about 40 to about 60, weight percent of said organosilane polysulfide compound and, correspondingly, (B) about 75 to about 25, preferably about 60 to about 40, weight percent carbon black.

A purpose of providing the organosilane polysulfide compound in a form of a particulate in the process of this invention is to add the organosilane disulfide in a form of a relatively dry, or substantially dry, powder in which the carbon black acts as a carrier for the organosilane polysulfide in the process of this invention, particularly where the organosilane polysulfide would normally otherwise be in a liquid, or substantially liquid, form A contemplated benefit for the particulate is to aid in the dispersing of the organosilane polysulfide in the preparatory mixing step(s) of the process of this invention and to aid in the introduction of the organosilane polysulfide into the preparatory mixing of the rubber composition mixture.

In further accordance with this invention, a rubber composition is provided which is prepared by the process of this invention.

In additional accordance with the invention, the process comprises a subsequent step of sulfur vulcanizing the prepared rubber composition, preferably at a temperature in a range of about 140° C. to about 190° C.

Accordingly, the invention also thereby contemplates a sulfur-vulcanized rubber composition, prepared by the process of the invention.

In additional accordance with the invention, the process comprises the additional, subsequent steps of preparing an assembly of a sulfur-vulcanizable rubber composition having at least one component of an unvulcanized (or vulcanized) rubber composition prepared by the process of this invention and vulcanizing the assembly at a temperature in a range of about 140° C. to about 190° C.

In one aspect of the invention, such assembly is a tire and, preferably, such component is a tire tread.

Accordingly, the invention also comprises a vulcanized tire prepared by such process.

Also, accordingly, the invention comprises said tire wherein the said component is a tread.

In a further aspect of the invention, optionally a total of about 0.05 to about 5 phr of at least one alkoxy silane, preferably an alkyl alkoxy silane, can be thermomechanically mixed in said preparatory mixing stage(s), particularly where said alkoxy silane has the formula: $R^3$—Si—$(OR^4)_3$, where $R^4$ is a methyl, ethyl, propyl or isopropyl radical, preferably a methyl and/or an ethyl radical and $R^3$ is a saturated alkyl radical having from 1 to 18, alternatively from 2 to 6, carbon atoms, or an aryl or saturated alkyl substituted aryl radical having from 6 to 12 carbon atoms. Such aryl or substituted aryl radicals might be, for example, benzyl, phenyl, tolyl, methyl tolyl, and alpha-methyl tolyl radicals.

A purpose of the alkoxy silane is, for example, to improve filler incorporation and compound aging. Representative examples of alkyl alkoxy silanes are, for example but not intended to be limited to, propyltriethoxysilane, methyltriethoxy silane, hexadecyltriethoxysilane, and octadecyltriethoxysilane For an additional aspect of this invention, optionally from about 5 to about 40 phr of a starch composite of starch and plasticizer may be thermomechanically mixed in said preparatory mixing stage(s).

Such starch composite preferably has a softening point in a range of about 110° C. to about 160° C. according to ASTM No. D1228.

Starch conventionally has a softening point in a range of about 180° C. to about 220° C. which is above normal rubber compound mixing temperatures. Accordingly, a starch/plasticizer combination, or as a composite thereof, is used with the plasticizer component having a melting point below 180° C. such as, for example, poly(ethylene vinyl acetate), cellulose acetate and diesters of dibasic organic acids, so long as they have a softening point below 180° C. and preferably below 160° C. It is contemplated that such starch composites contain hydroxyl groups on the surface thereof which are available for reaction with coupling agents as described below. Representative examples of use of starch composites in rubber compositions may be found, for example, in U.S. Pat. No. 5,672,639.

A significant feature of this invention is the utilization of a silane condensation reaction promoter and/or inhibitor to control the rate of in-situ formation of the polysiloxane network which is accomplished by the condensation of the silane coupling agent within the rubber composition.

Accordingly, the silane condensation reaction may be facilitated, for example, by a promoter where it is desired to increase the condensation reaction rate or by a condensation reaction inhibitor where it is desired to retard the condensation reaction rate.

While the mechanism may not be completely understood, it is hypothesized that a polysiloxane-based network (e.g.: a network of at least partially entangled polysiloxane polymer chains) is created by an in-situ formation of a polysiloxane-based polymer chain, resulting from silane condensation promoted by said specified amino acid or derived proteins based condensation reaction promoter, extending into and within already formed polymer chains of the elastomer host This phenomenon can take place at the interface (filler/elastomer) which means at the vicinity of the filler surface and/or in the polymer matrix.

For example, it is hypothesized that utilization of a bis-(trialkoxyorganosilane)polysulfide compound, preferably a bis-(trialkoxyorganosilane)disulfide compound, in combination with said amino acid or derived proteins based silane condensation reaction promoter for enhancing a reaction of the bis-(trialkoxyorganosilane)polysulfide compound with silanol groups on the silica-based filler and, also, alkoxy moieties of the trialkoxyorganosilane polysulfide compound, react to form a polysiloxane which in turn, may lead to formation of a polysiloxane network at the surface of the filler and/or within the elastomer.

For another significant aspect of the practice of the invention, it is considered herein that a significant departure from past practice, when using a bis-(alkoxyorganosilane) disulfide compound which contains an average of from 2 to 2.6 sulfur atoms in its polysulfidic bridge is (A) promoting a creation of the polysiloxane polymer network via the required promotion of the alkoxysilane condensation reaction with the said specified amino acid or derived proteins based promoter, which would be accompanied by an expected increase in viscosity of the overall elastomer composition with, correspondingly, a somewhat adverse impact upon its processability because of the increase in rubber composite viscosity yet, however, (B) in the absence of viscosity-increasing sulfur moieties being liberated because the bis-(alkoxyorganosilane) polysulfide compound is a primarily a disulfide compound since it contains an average of only 2 to 2.6, instead of the aforesaid 3.5 to 4.5, connecting sulfur atoms in its polysulfide bridge Indeed, it is the very use of a bis(alkoxyorganosilane) compound with the aforesaid connecting sulfur units of the polysulfide bridge being limited to an average of 2 to 2.6, instead of using a bis-(alkoxyorganosilane)polysulfide with an average of 3.5 to 4.5 sulfur atoms in its polysulfidic bridge that enables an operational freedom in processing the unvulcanized rubber composition to be able to tolerate a increase in viscosity of the rubber composition via promoting the aforesaid silane condensation reaction with the use of said specified amino acid or derived proteins based promoter.

As hereinbefore discussed, another important feature of this invention is that the specified amino acids or the derived proteins for use in this invention are considered herein to not only participate as activators for activation of the silane condensation reaction but, also have an ability to react with a diene based elastomer (such as, for example, the cysteine and cystine amino acids) and/or are considered herein to tend to be synergistic with sulfur cure systems, based upon sulfur cure accelerators such as, for example mercaptobenzothiazole based accelerators and sulfenamide based accelerators for diene-based elastomers (such as, for example, the glutamine and serine amino acids).

As a result, it is considered herein that a new method has been discovered to modify, or tune, various physical properties of elastomers via use of chemical control via use of selected amino acids as silane condensation reaction promoters within an elastomer host in addition to the thermomechanical mixing conditions.

Such new method is based upon the use of said specified amino acid or derived proteins based materials to promote a condensation of an alkoxysilane and/or alkoxysilane polysulfide within an elastomer host, to react with a diene based elastomer (such as, for example, the cysteine and cystine amino acids) and/or to be synergistic with sulfur cure systems, based upon sulfur cure accelerators such as, for example mercaptobenzothiazole based sulfur cure accelerators for diene-based elastomers (such as, for example, the glutamine and serine amino acids) instead of using an acidic or basic condensation promoter or a protein based promoter other than said specified amino acid based promoter which prime utility would be as promoters for silane condensation reactions.

The actual selection of an individual specified amino acid based condensation reaction promoter for use in this invention will depend somewhat upon the sensitivity of the rubber matrix, or composition, itself and the balance of desired physical properties. Such selection can readily be made by one having skill in such art.

Thus, the condensation reaction and the impact on the sulfur network may be controlled by said specified amino acid or derived proteins based condensation reaction promoter depending somewhat upon the magnitude of the effect desired and the silica-based filler used.

Where it is desired for the rubber composition, which contains both a siliceous filler such as silica, alumina and/or aluminosilicates, carbon black and silica-modified carbon black reinforcing pigments, to be primarily reinforced with silica-based filler(s) as the reinforcing filler, it is often preferable that the weight ratio of such silica-based fillers to carbon black is at least 1/10 and preferably at least 10/1.

In one aspect of the invention, it is preferred that the silica-based filler is precipitated silica.

In another aspect of the invention, the filler is comprised of about 15 to about 95 weight percent precipitated silica, alumina, aluminosilicate and/or silica-modified carbon black, correspondingly, about 5 to about 85 weight percent carbon black; wherein the said carbon black has a CTAB value in a range of about 80 to about 150.

In a practice of this invention, said filler can be comprised of about 60 to about 95 weight percent of said silica, alumina, aluminosilicate and/or silica-modified carbon black, and, correspondingly, about 40 to about 5 weight percent carbon black.

The aluminosilicate can be prepared, for example, by co-precipitation of a sodium silicate and an aluminate. The preparation of aluminosilicates is well known to those having skill in such art.

The silica-modified carbon black may be prepared, for example, by reacting carbon black with a siloxane or by co-fuming carbon black and silica an elevated temperature. Such methods of modifying carbon black with silica are known to those having skill in such art.

Representative examples of bis-(alkoxyorganosilane) disulfides (Formula I) include, for example, 2,2'-bis(trimethoxysilylethyl)disulfide; 3,3'-bis(trimethoxysilylpropyl)disulfide; 3,3'-bis(triethoxysilylpropyl)disulfide; 2,2'-bis(triethoxysilylethyl)disulfide; 3,3'-bis(triethoxysilylpropyl)disulfide; 2,2'-bis(tripropoxysilylethyl)disulfide, 2,2'-bi(tri-sec butoxysilylethyl)disulfide; 3,3'-bis(tri-t-butoxysilylethyl)disulfide; 3,3'-bis(triethoxysilylethyl tolylene)disulfide; 3,3'-bis(trimethoxysilylethyl tolylene)disulfide; 3,3'-bis(triisopropoxysilylpropyl)disulfide; 3,3'-bis(trioctoxysilylpropyl)disulfide, 2,2'-bis(2'-ethylhexoxysilylethyl)disulfide; 2,2'-bis(dimethoxy ethoxysilylethyl)disulfide; 3,3'-bis(methoxyethoxypropoxysilylpropyl)disulfide; 3,3 '-bis(methoxydimethylsilylpropyl)disulfide; 3,3'-bis(cyclohexoxy dimethylsilylpropyl)disulfide; 4,4'-bis(trimethoxysilylbutyl)disulfide, 3,3'-bis(trimethoxysilyl-3-methylpropyl)disulfide; 3,3'-bis(tripropoxysilyl-3-methylpropyl)disulfide; 3,3'-bis(dimethoxymethylsilyl-3-ethylpropyl)disulfide; 3,3'-bis(trimethoxysilyl-2-methylpropyl)disulfide; 3,3'-bis(dimethoxyphenylsilyl-2-methylpropyl)disulfide; 3,3'-bis(trimethoxysilylcyclohexyl)disulfide; 12,12'-bis(trimethoxysilyldodecyl)disulfide; 12,12'-bis(triethoxysilyldodecyl)disulfide; 18,18'-bis(trimethoxysilyloctadecyl)disulfide; 18,18'-bis(methoxydimethylsilyloctadecyl)disulfide; 2,2-'-bis(trimethoxysilyl-2-methylethyl)disulfide; 2,2'-bis(triethoxysilyl-2-methylethyl)disulfide; 2,2'-bis(tripropoxysilyl-2-methylethyl)disulfide; and 2,2'-bis(trioctoxysilyl-2-methylethyl)disulfide.

Representative examples of compounds according to Formula (II) are, for example, mercapto propyl triethoxysilane, gamma-amino propyl triethoxysilane, vinyl triethoxysilane, gamma-glycidoxy propyltriethoxysilane, gamma-methacryloxypropyltriethoxysilane.

In general, preferred compounds according to Formula (II) are mercaptopropyltriethoxysilane, gamma-glycidoxy propyltriethoxysilane, gamma-aminopropyltriethoxysilane.

In the practice of this invention, as hereinbefore pointed out, the rubber composition is comprised of at least one diene-based elastomer, or rubber. Suitable conjugated dienes are isoprene and 1,3-butadiene and suitable vinyl aromatic compounds are styrene and alpha-methylstyrene. Thus, it is considered that the elastomer is a sulfur-curable elastomer.

Such diene-based elastomer, or rubber, may be selected, for example, from at least one of cis 1,4-polyisoprene rubber (natural and/or synthetic), and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubbers, cis 1,4-polybutadiene, high vinyl polybutadiene rubber (35 to 90 percent vinyl), styrene/isoprene copolymers, emulsion polymerization prepared styrene/butadiene/acrylonitrile terpolymer rubber and butadiene/acrylonitrile copolymer rubber.

By emulsion polymerization prepared E-SBR, it is meant that styrene and 1,3-butadiene are copolymerized as an aqueous emulsion. Such are well known to those skilled in such art. The bound styrene content can vary, for example, from about 5 to 55 percent. In one aspect, the E-SBR may also contain acrylonitrile to form a terpolymer rubber, as E-SNBR, in amounts, for example, of about 2 to about 30 weight percent bound acrylonitrile in the terpolymer The solution polymerization prepared SBR (S-SBR) typically has a bound styrene content in a range of about 5 to about 55, preferably about 9 to about 36, percent. The S-SBR can be conveniently prepared, for example, by organo lithium catalyzation in the presence of an organic hydrocarbon solvent.

The 3,4-polyisoprene rubber (3,4-PI) is considered beneficial for a purpose of enhancing the tire's traction when it is used in a tire tread composition. When used, it is usually used in a minor amount of the rubber component(s) of a rubber composition (e.g.: 5 to 15 phr).

The 3,4-polyisoprene elastomer and use thereof is more fully described in U.S. Pat. No. 5,087,668 which is incorporated herein by reference.

The cis 1,4-polybutadiene rubber is considered to be beneficial for a purpose of enhancing the tire tread's wear, or treadwear.

Such polybutadiene elastomer can be prepared, for example, by organic solution polymerization of 1,3-butadiene as is well known to those having skill in such art.

The cis 1,4-polybutadiene elastomer may be conveniently characterized, for example, by having at least a 90 percent cis 1,4-content.

The cis 1,4-polyisoprene and cis 1,4-polyisoprene natural rubber are well known to those having skill in the rubber art.

In the practice of this invention, it is further contemplated that alkoxysilane-terminated and tin coupled solution polymerization prepared elastomers may also be used.

The alkoxysilane-terminated elastomers may be prepared, for example, by introduction of a chloro-alkoxysilane, chloro-alkylalkoxysilane or 3,3'-bis-(triethoxysilylpropyl) disulfide, into the polymerization system during the preparation of the elastomer, usually at or near the end of the polymerization. Such termination of such elastomers and the preparation thereof are well known to those having skill in such art.

Tin coupled elastomers are prepared by introducing a tin coupling agent during the polymerization reaction, usually at or near the end of the polymerization. Tin coupling of elastomers is well known to those having skill in such art.

Representative of tin coupled diene-based elastomers are, for example styrene/butadiene copolymers, isoprene/butadiene copolymers and styrene/isoprene/butadiene terpolymers.

In one aspect, it is preferred that a major portion, preferably at least about 50 percent, and more generally in a range of about 60 to about 85 percent of the Sn bonds in the tin coupled elastomer, are bonded to diene units of the styrene/diene copolymer, or diene/diene copolymer as the case may be, which might be referred to herein as "Sn-dienyl bonds" (or Si-dienyl bonds), such as, for example, butadienyl bonds in the case of butadiene being terminus with the tin.

Creation of tin-dienyl bonds can be accomplished in a number of ways such as, for example, sequential addition of butadiene to the copolymerization system or use of modifiers to alter the styrene and/or butadiene and/or isoprene reactivity ratios for the copolymerization. It is believed that such techniques, whether used with a batch or continuous copolymerization system, is well known to those having skill in such art.

The tin coupling of the elastomer can be accomplished by relatively conventional means and is believed to be well known to those skilled in such art.

Various tin compounds can be used for such purpose and tin tetrachloride is usually preferred. The tin coupled copolymer elastomer can also be tin coupled with an organo tin compound such as, for example, alkyl tin trichloride, dialkyl tin dichloride and trialkyl tin monochloride, yielding variants of a tin coupled copolymer with the trialkyl tin monochloride yielding simply a tin terminated copolymer Examples of tin modified, or coupled, styrene/butadiene might be found in, for example, U.S. Pat. No. 5,064,910.

The vulcanized rubber composition should contain a sufficient amount of silica, and carbon black if used, reinforcing filler(s) to contribute a reasonably high modulus and high resistance to tear. The combined weight of the silica, alumina, aluminosilicates and/or silica-modified carbon black, as well as carbon black, as hereinbefore referenced, may be as low as about 30 parts per 100 parts rubber, but is more preferably from about 35 to about 90 parts by weight.

While it is considered herein that commonly-employed siliceous pigments used in rubber compounding applications might be used as the silica in this invention, including pyrogenic and precipitated siliceous pigments (silica) alumina, aluminosilicates, precipitated silicas are preferred.

The siliceous pigments preferably employed in this invention are precipitated silicas such as, for example, those obtained by the acidification of a soluble silicate, e.g., sodium silicate. Such precipitated silicas are well known to those having skill in such art.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) value in a range of about 100 to about 350, and more usually about 150 to about 300 cm³/100 g (ASTM D2414).

Further, the silica, as well as the aforesaid alumina and aluminosilicate may be expected to have a CTAB surface area in a range of about 100 to about 220 m2/g (ASTM D3849). The CTAB surface area is the external surface area as evaluated by cetyl trimethylammonium bromide with a pH of 9. The method is described in ASTM D 3849 for set up and evaluation. The CTAB surface area is a well known means for characterization of silica.

Mercury surface area/porosity is the specific surface area determined by Mercury porosimetry. For such technique, mercury is penetrated into the pores of the sample after a thermal treatment to remove volatiles. Set up conditions may be suitably described as using a 100 mg sample; removing volatiles during 2 hours at 105° C. and ambient atmospheric pressure; ambient to 2000 bars pressure measuring range Such evaluation may be performed according to the method described in Winslow, Shapiro in ASTM bulletin, Page 39 (1959) or according to DIN 66133. For such an evaluation, a CARLO-ERBA Porosimeter 2000 might be used.

The average mercury porosity specific surface area for the silica should be in a range of about 100 to 300 m²/g.

A suitable pore size distribution for the silica, alumina and aluminosilicate according to such mercury porosity evaluation, is considered herein to be.

(A) five percent or less of its pores have a diameter of less than about 10 nm;

(B) 60 to 90 percent of its pores have a diameter of about 10 to about 100 nm;

(C) 10 to 30 percent of its pores have a diameter of about 100 to about 1000 nm; and (D) 5 to 20 percent of its pores have a diameter of greater than about 1000 nm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations Hi-Sil 210, 243, etc; silicas available from Rhodia with, for example, designations of Zeosil 1165MP and Zeosil 165GR, silicas available from Degussa AG with, for example, designations VN2, VN3, Ultrasil 7000 and Ultrasil 7005, and silicas commercially available from Huber having, for example, a designation of Hubersil 8745 and Hubersil 8715.

Representative examples of alumina for the purposes of this invention are natural and synthetic aluminum oxide ($Al_2O_3$). Such alumina can be suitably, synthetically prepared, for example, by controlled precipitation of aluminum hydroxide. For example, neutral, acidic, and basic $Al_2O_3$ can be obtained from the Aldrich Chemical Company. In the practice of this invention, the neutral alumina is preferred, however, it is considered herein that the acidic, basic and neutral forms of alumina could be used. The neutral, or substantially neutral form is indicated as being preferential in order to use a form with reduced number of surface hydroxyl groups as compared to the acidic form and, also, to reduce the basic sites of the alumina which are AlO-ions, representing a strong base, in order to reduce potential interferences with the desired reactions of the alumina with the organosilane disulfide coupler Representative examples of aluminosilicates for the purposes of this invention are, for example but not intended to be limited to, Sepiolite as a natural aluminosilicate which might be obtained as PANSIL from Tolsa S.A., Toledo, Spain and SILTEG as a synthetic aluminosilicate from Degussa GmbH. Such aluminosilicates can be used as natural materials or synthetically prepared, for example, as hereinbefore exemplified.

It is readily understood by those having skill in the art that the rubber composition would be compounded by methods generally known in the rubber compounding art such as mixing the various sulfur-vulcanizable constituent rubbers with various commonly-used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur-vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include, for example, elemental sulfur (free sulfur) or sulfur donating vulcanizing agents, for example, an amine disulfide, polymeric polysulfide or sulfur olefin adducts which are conventionally added in the final, productive, rubber composition mixing step. Preferably, in most cases, the sulfur vulcanizing agent is elemental sulfur. As known to those skilled in the art, sulfur vulcanizing agents are used, or added in the productive mixing stage, in an amount ranging from about 0.4 to about 3 phr, or even, in some circumstances, up to about 8 phr, with a range of from about 1.5 to about 2.5, sometimes from 2 to 2.5, being usually preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

Sulfur-vulcanizable rubber compositions which contain silica reinforcement are prepared utilizing a relatively high purity bis(3-triethoxysilylpropyl)disulfide compound alternately in combination with a selected amino acid, namely cysteine.

Such rubber compositions are identified herein as Samples A, B and C, with Sample A being considered herein as a Control sample without the cysteine addition.

For Samples B and C, a specified amino acid, namely cysteine, is also added in the non-productive mixing stage after the silica-based filler and coupling agent have been added.

Rubber compositions containing the ingredients shown in Table 1 were prepared in a BR Banbury internal rubber mixer via the aforesaid sequential three separate stages of mixing, namely, two preparatory mix stages followed by a final mix stage to temperatures of about 170° C., 170° C. and 120° C., respectively. The mixing time for the first preparation (non-productive) mixing step is variable and the mixing times for the second and third preparatory steps are about two minutes each.

After each mixing step the rubber mixture was batched off on a mill, mill mixed for a short period of time, and slabs of rubber removed from the mill and allowed to cool to a temperature of about 30° C. or lower.

TABLE 1

| Sample | A | B | C |
|---|---|---|---|
| Non-productive Mix Stage | | | |
| Elastomer[1] | 100 | 100 | 100 |
| Cysteine | 0 | 1 | 2 |
| Oil | 10 | 10 | 10 |
| Antidegradant[2] | 1 | 1 | 1 |
| Silica[3] | 50 | 50 | 50 |
| Coupling agent[4] | 4 | 4 | 4 |
| Productive Mix Stage | | | |
| Zinc oxide | 2.5 | 2.5 | 2.5 |
| Stearic acid | 3 | 3 | 3 |
| Sulfur | 2 | 2 | 2 |
| Sulfenamide based accelerator | 1.6 | 1.6 | 1.6 |
| Diphenylguanidine accelerator | 2 | 2 | 2 |

[1]Isoprene/butadiene (50/50) copolymer elastomer having a Tg of about −44° C. obtained from The Goodyear Tire & Rubber Company
[2]A phenylene diamine type
[3]Zeosil 1165 MP silica from Rhone Poulenc
[4]A liquid coupling agent available from Degussa AG as Si266, as a bis-(3-triethoxysilylpropyl) disulfide having an average of about 2.2 connecting sulfur groups in its polysulfidic bridge

TABLE 2

| Sample | A | B | C |
|---|---|---|---|
| Ring Tensile | | | |
| 100% modulus (MPa) | 1.84 | 1.9 | 1.97 |
| 300% modulus (MPa) | 11.49 | 12.3 | 13.41 |
| Break strength (MPa) | 15.1 | 16.17 | 14.23 |
| Energy, J | 92.11 | 96.81 | 73.21 |
| Elongation at break (%) | 378 | 378 | 331 |
| Hardness (Shore A) | | | |
| 23° C. | 61.2 | 60.9 | 61 |
| Zwick Rebound - Original | | | |
| 23° C. | 41 | 42.1 | 42.6 |
| 100° C. | 75.5 | 77.2 | 77.9 |
| RPA, Cured Compound | | | |
| T10 | 2.84 | 2.46 | 1.93 |
| T90 | 5.84 | 5.33 | 4.48 |
| Delta torque | 8.05 | 7.48 | 6.84 |
| G' at 1% strain | 1771 | 1667 | 1536 |
| G' at 50% strain | 771 | 787 | 775 |
| G' at 50%/G' at 1% | 0.435 | 0.472 | 0.505 |
| Tan delta at 15% strain | 0.196 | 0.147 | 0.096 |

From Table 2 it can be seen that the addition of the specified amino acid, namely the cysteine for Samples B and C resulted in various physical properties superior to such physical properties of Control Sample A. In particular, it is seen that hot rebound property increased substantially and the tan delta property decreased which are indications of reduced hysteresis for the rubber product (predictive for better rolling resistance or vehicle fuel economy for a tire with a tread of such rubber composition). The 300 percent modulus is observed to increase gradually as the amount of the amino acid is increased at nearly the same hardness which should improve tire handling performance for a tire with a tread of such rubber composition.

The initial cure time for Samples B and C, as compared to Control Sample A is reduced as shown by the T10 cure times. The subsequent T90 cure time is also reduced which is an advantage for a reduced cure cycle time at equal or better compound physical properties such as the indicated 300 percent modulus and Shore A hardness values.

EXAMPLE II

Sulfur-vulcanizable rubber compositions which contain silica reinforcement are prepared utilizing a relatively high purity bis(3-triethoxysilylpropyl)disulfide compound and alternately addition of a cystine amino acid.

Such rubber compositions are identified herein as Samples D and E with Sample E being considered herein as a Control sample.

For Samples B and C, a specified amino acid, namely cystine, is also added in the non-productive mixing stage after the silica-based filler and coupling agent have been added.

Rubber compositions containing the ingredients shown in Table 3 were prepared in a BR Banbury internal rubber mixer via the aforesaid sequential three separate stages of mixing, namely, two preparatory mix stages followed by a final mix stage to temperatures of about 170° C., 170° C. and 120° C., respectively. The mixing time for the first preparation (non-productive) mixing step is variable and the mixing times for the second and third preparatory steps are about two minutes each.

After each mixing step the rubber mixture was batched off on a mill, mill mixed for a short period of time, and slabs of rubber removed from the mill and allowed to cool to a temperature of about 30° C. or lower.

TABLE 3

| Sample | D | E |
|---|---|---|
| Non-productive Mix Stage | | |
| Elastomer[1] | 100 | 100 |
| Cystine | 0 | 2 |
| Antidegradant[2] | 1 | 1 |
| Oil | 10 | 10 |
| Silica[3] | 50 | 50 |
| Coupling agent[4] | 4 | 4 |
| Productive Mix Stage | | |
| Zinc Oxide | 2.5 | 2.5 |
| Stearic acid | 3 | 3 |
| Sulfur | 2 | 2 |
| Sulfenamide type accelerator | 1.6 | 1.6 |
| Diphenylguanidine accelerator | 2 | 2 |

[1]Styrene butadiene copolymer elastomers having a Tg of about −15° C. obtained as Solflex 2552 from The Goodyear Tire & Rubber Company
[2]A phenylene diamine type
[3]Zeosil 1165 MP silica from Rhone Poulenc
[4]A liquid available from Degussa AG as Si266, a bis-(3-triethoxysilylpropyl) disulfide coupling agent, having an average of about 2.2 connecting sulfur atoms in its polysulfidic bridge.

TABLE 4

| Sample | D | E |
|---|---|---|
| Rheometer - ODR | | |
| TC 50 | 6.73 | 4.08 |
| TC 90 | 26.46 | 25.56 |
| Ring Tensile | | |
| 100% modulus (MPa) | 2.01 | 2.35 |
| 300% modulus (MPa) | 16.07 | 17.49 |
| Break strength (MPa) | 16.85 | 16.5 |
| Energy, J | 76.14 | 74.3 |
| Elongation at break (%) | 327 | 302 |
| Hardness (Shore A) | | |
| 23° C. | 66.3 | 68.5 |
| RPA: Cured Compound | | |
| T10 | 3.13 | 1.92 |
| T90 | 7.30 | 6.45 |
| Delta S' | 6.08 | 5.92 |
| G' at 1% strain | 1388 | 1432 |
| G' at 50% strain | 924 | 942 |
| G' at 50%/G' at 1% | 0.666 | 0.658 |
| Tan delta at 15% strain | 0.051 | 0.057 |
| Insoluble polymer (NP) % | 54 | 63 |

This example shows substantially the same trends as those described in Example I but it emphasizes the impact on the cure being faster and the effect on the insoluble rubber which increases with the addition of the amino acid which is an indication for a more efficient silane condensation reaction.

This Example shows then the dual effect of the selected amino acid activator both from a silane condensation standpoint and from a cure synergism aspect.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a composite of an elastomer composition which contains precipitated silica reinforcement therein comprises the sequential steps of:

(A) thermomechanically mixing in at least one preparatory mixing step to a temperature of about 140° C. to about 190° C.,
  (1) 100 parts by weight of at least one sulfur vulcanizable elastomer selected from homopolymers and copolymers of conjugated diene hydrocarbons copolymers of at least one conjugated diene hydrocarbon and vinyl aromatic compound,
  (2) about 15 to about 100 phr precipitated silica which contains silanol groups on the surface thereof,
  (3) about 0.05 to about 20 parts by weight per part by weight of said precipitated silica of at least one organosilane compound selected from at least one of an organosilane polysulfide compound of Formula (I) and an organosilane compound of Formula (II) their mixtures:

wherein n has a value of from 2 to 8 with is an average of from 3.5 to 4.5, or an integer of from 2 to 4 with an average of from 2 to 2.6;
wherein Z is selected from the group consisting of:

wherein $R^1$ is an alkylene group having a total of 1 to 18 carbon atoms; wherein $R^2$ is the same or different and is individually selected from the group consisting of alkyls having 1 to 4 carbons and phenyl; and $R^3$ is the same or different and is individually selected from $R^4O$-radicals wherein $R^4$ is an alkyl radical containing from 1 to 4 carbon atoms; and
wherein X is a mercapto group;
(B) mixing therewith at least one amino acid comprised of cystein;
(C) subsequently blending sulfur therewith, in a final thermomechanical mixing step at a temperature to about 100° C. to about 130° C.;
wherein said preparatory mixing step (A) is composed of at least two sequential mixing stages in which said elastomer, said precipitated silica and said organosilane compound are added and mixed in one or more sequential mixing stages and in which said amino acid is added subsequent to the addition of both of said precipitated silica and organosilane compound in the same or subsequent mixing stage.

2. The process of claim 1 wherein said preparatory mixing is conducted in at least two sequential thermomechanical mixing steps in at least one internal rubber mixer; wherein at least two of said mixing steps are conducted to a temperature in a range of about 140° C. to about 190° C., with intermediate cooling of the rubber composition between at least two of the said mixing steps to a temperature below about 50° C.

3. The process of claim 1 wherein said preparatory mixing step (A) is composed of at least two sequential mixing stages in which said elastomer and about 20 to about 60 weight percent of each of said precipitated silica and said organosilane polysulfide are added and mixed in a first preparatory mixing stage and the remainder thereof added and mixed in at least one subsequent preparatory mixing stage; wherein said amino based silane condensation promoter is added and mixed subsequent to the completed addition said silica-based filler and organosilane polysulfide in the same or subsequent mixing stage.

4. The process of claim 1 wherein the polysulfidic bridge of said organosilane polysulfide contains an average of from 2 to 2.6 sulfur atoms.

5. The process of claim 1 wherein a total of about 0.05 to about 5 phr of at least one alkoxy silane is further added to said preparatory thermomechanical mixing step(s); wherein said alkoxy silane has the formula: $R^3$—Si—$(OR^4)_3$, where $R^3$ is selected from at least one of methyl, ethyl, propyl and isopropyl radicals and $R^4$ is a saturated alkyl having from 6 to 18 carbon atoms or aryl or saturated alkyl substituted aryl radical having from 6 to 12 carbon atoms.

6. The process of claim 5 wherein said alkoxy silane is selected from one or more of propyltriethoxy silane, methyltriethoxy silane, hexadecyltriethoxy silane and octadecyltriethoxy silane.

7. The process of claim 1 wherein about 5 to about 40 phr of a starch composite comprised of starch and plasticizer is added in said preparatory mixing stage(s) (A); wherein said starch composite has a softening point in a range of about 110° C. to about 160° C. according to ASTM No. D1228.

8. The process of claim 7 where said plasticizer contains hydroxyl groups on the surface thereon and comprises at least one of poly(ethylene vinyl acetate), cellulose acetate and diesters of dibasic organic acids having a softening point below 160° C.

9. The process of claim 1 where said sulfur-vulcanizable elastomer is selected from at least one of natural and synthetic cis 1,4-polyisoprene rubber, emulsion polymerization prepared styrene/butadiene copolymer rubber, organic solution polymerization prepared styrene/butadiene copolymer rubber, 3,4-polyisoprene rubber, isoprene/butadiene rubber, styrene/isoprene/butadiene terpolymer rubbers, cis 1,4-polybutadiene rubber, medium vinyl polybutadiene rubber (35 to 50 percent vinyl), high vinyl polybutadiene (50 to 75 percent vinyl) and emulsion polymerization prepared styrene/butadiene/acrylonitrile terpolymer rubber and butadiene/acrylonitrile copolymer rubber.

10. The process of claim 1 wherein said elastomer is an organic solution polymerization derived elastomer selected from at least one of alkoxy terminated elastomer and tin coupled elastomer.

11. A rubber composition prepared by the process of claim 1.

12. A vulcanized rubber composition prepared by the process of claim 1 wherein said process comprises a subsequent step of sulfur vulcanizing the resulting rubber composition.

13. A tire having at least one component as the rubber composition of claim 12.

14. The tire of claim 13 wherein said component is a tread.

15. The process of claim 1 which comprises a subsequent step of preparing an assembly of a sulfur vulcanizable rubber composition having at least one component of the rubber composition prepared according to claim 1 and sulfur vulcanizing said assembly at a temperature in a range of about 140° C. to about 190° C.

16. The process of claim 15 wherein said assembly is a tire and said component is a tread.

17. A tire having at least one component comprised of a rubber composition prepared according to claim 1.

18. The tire of claim 17 wherein said component is a tread.

* * * * *